Nov. 24, 1953          J. A. FIELD          2,660,705
DEVICE FOR MEASURING ALTERNATING CURRENT IMPEDANCES
Filed Nov. 1, 1950
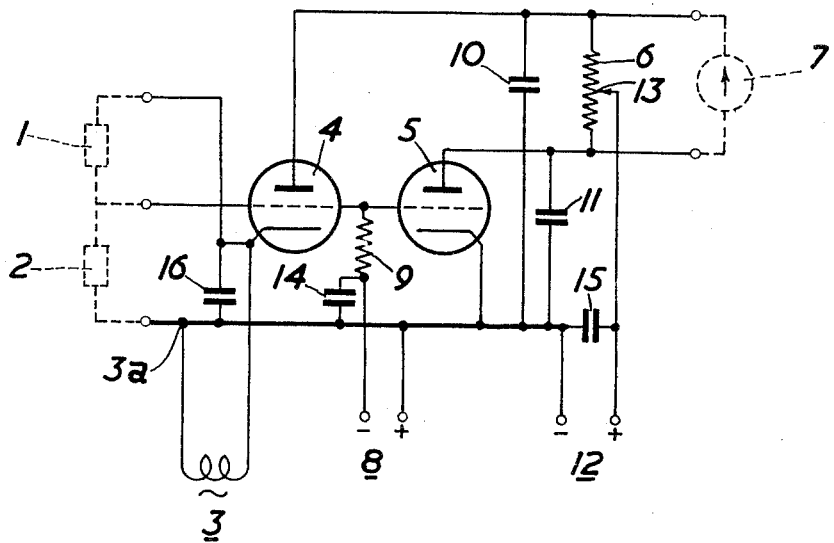
Inventor
JOHN ALFRED FIELD
By W. C. Lyon
Attorney Patented Nov. 24, 1953

2,660,705

UNITED STATES PATENT OFFICE 2,660,705

DEVICE FOR MEASURING ALTERNATING CURRENT IMPEDANCES

John A. Field, Wilstead, England, assignor to Cutler-Hammer, Inc., Milwaukee, Wis., a corporation of Delaware Application November 1, 1950, Serial No. 193,408

Claims priority, application Great Britain November 11, 1949

4 Claims. (Cl. 324—57)

This invention relates to devices for measuring alternating current impedances and has for its main object the provision of a simple bridge circuit which is particularly suitable for obtaining a visual indication of small changes in capacity.

The invention consists broadly of a device for measuring alternating current impedances, comprising means for distributing alternating current voltage across two impedances to be compared in a ratio corresponding to the values of said impedances, means for applying the alternating current voltages across said impedances respectively to the sensitive circuits of electronic devices, and means for comparing the conductivity of said electronic devices and thereby comparing said impedances.

In order that the invention may be more clearly understood, an apparatus in accordance therewith will now be described, reference being made to the accompanying circuit diagram in which said apparatus is illustrated.

Referring to this drawing the two impedances 1 and 2 to be compared are connected in series across an alternating current supply. Two thermionic triode valves 4 and 5 are provided whose grids are connected together and to the point between said impedances, and the remote ends of the two impedances are respectively connected to the cathodes of said valves. A potentiometer resistance 6 is connected across the anodes of said valves and so also is an indicating device 7.

A negative bias voltage is applied to the grids of the valves 4 and 5 by way of a battery 8 and resistance 9 in series connected between said grids on the one hand and one (3a) of the terminals of the alternating current supply 3 on the other (it being understood that said terminals are of the same potential in respect of direct current). Capacitors 10 and 11 are respectively connected between the anodes of the valves 4 and 5 and the said terminal 3a of the alternating current supply, for the purpose of smoothing the anode currents.

The anode voltage to the two valves 4 and 5 is supplied from a direct current source 12 one of whose terminals is connected to an adjustable tapped point 13 of the potentiometer 6 and the other to the said terminal 3a of the alternating current supply 3.

Capacitors 14 and 15 are respectively connected across the grid bias battery 8 and the direct current source of anode voltage to filter out any undesired alternating current component which may be present. A capacitor 16, which must be of low impedance relative to the impedances 1 and 2 to be compared, is connected across the alternating current supply 3.

If the impedance and voltage to the terminals of the alternating current supply 3 are comparatively low and the grid bias resistor 9 has high resistance and low capacity, and the grid bias voltage is such that the grid currents are very small, then the distribution of the alternating current voltage across the two impedances 1 and 2 to be compared corresponds to the values of those impedances. Thus, corresponding anode currents will flow through the respective valves 4 and 5 for some portion of the appropriate half cycles, and these may be integrated by the capacitors 10 and 11 which are connected between the anodes and cathodes of the valves so that direct currents will flow in opposing directions in the potentiometer 6. It will be seen that by moving the tapped point 13 of said potentiometer a position can be found which gives no deflection on the indicating device 7. Then the portions of the potentiometer resistance 6 on the two sides of the tapped point 13 will bear the same ratio to one another as the impedances 1 and 2 to be compared, and, the value of one impedance being known, the other can be determined.

Alternatively, by setting the tapped point 13 at a position corresponding to two equal impedances, and employing a known or standard impedance as one of the impedances to be compared, the indicating device 7 can be calibrated to indicate the value of the other impedance.

The aforesaid terminal 3a of the alternating current supply may conveniently be earthed. The alternating current supply being of comparatively low impedance and voltage, the other terminal of said alternating current supply may also be regarded as of earth potential. Thus, there is only one point in the circuit, viz. the point between the impedances 1 and 2 to be compared which is at high impedance to earth. This makes the circuit very suitable for the measurement of small capacities between a conductor and an earth.

The above is a description of the basic circuit, and various additions can be made thereto, for example, multigrid valves can be used in place of the triodes, and a suitable amplifier can be employed to amplify the current to the indicating device.

What I claim is:

1. In a network for measuring alternating current impedances, in combination, two series connected impedances to be compared in respect of their alternating current impedance values, circuit means for distributing alternating voltages across said impedances in a ratio corresponding to their impedance values, a pair of grid controlled electron tubes, said impedances each being connected in a grid-cathode circuit of an associated one of said tubes such that the grids have common connection between said impedances, and an adjustable voltage divider having its resistance element connected across the anodes of said tubes and affording regulation of the values of plate current flowing through said tubes in accordance with the adjustment of its movable tap.

2. In a network for measuring alternating current impedances, in combination, two series connected impedances to be compared in respect of their alternating current impedance values, circuit means for distributing alternating voltages across said impedances in a ratio corresponding to their impedance values, a pair of grid controlled electron tubes, said impedances each being connected in a grid-cathode circuit of an associated one of said tubes such that the grids have common connection between said impedances, an adjustable voltage divider having its resistance element connected across the anodes of said tubes and affording regulation of the values of plate current flowing through said tubes in accordance with the adjustment of its movable tap, and an electrical indicating device connected in parallel across the resistance element of said voltage divider.

3. In combination, a source of alternating voltage, two impedances to be compared in respect of their alternating current impedance values connected in series across said source, a pair of grid controlled electron tubes having their control grids connected to the common point between said impedances, said tubes having their cathodes connected respectively to opposite sides of said source, means subjecting the control grids to a negative direct current bias, a source of unidirectional voltage, and an adjustable voltage divider having its resistance element connected across the anodes of said tubes and having its movable tap connected to the last mentioned source.

4. In combination, a source of alternating voltage, two impedances to be compared in respect of their alternating current impedance values connected in series across said source, a pair of grid controlled electron tubes having their control grids connected to the common point between said impedances, said tubes having their cathodes connected respectively to opposite sides of said source, means subjecting the control grids to a negative direct current bias, a source of unidirectional current, an adjustable voltage divider having its resistance element connected across the anodes of said tubes and having its movable tap connected to the last mentioned source, and an electrical indicating device connected in parallel across the resistance element of said voltage divider.

JOHN A. FIELD.

References Cited in the file of this patent

UNITED STATES PATENTS

| Number | Name | Date |
|---|---|---|
| 1,919,538 | Stone | July 25, 1933 |
| 2,323,128 | Hare | June 29, 1943 |
| 2,525,780 | Dennis | Oct. 17, 1950 |